(12) United States Patent
Shao et al.

(10) Patent No.: US 11,765,403 B1
(45) Date of Patent: Sep. 19, 2023

(54) METHODS AND INTERNET OF THINGS SYSTEMS FOR CONTROLLING PUBLIC LANDSCAPE LIVE BROADCAST IN SMART CITIES

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Yongzeng Liang, Chengdu (CN); Xiaojun Wei, Chengdu (CN); Zhihui Wen, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/817,994

(22) Filed: Aug. 7, 2022

(30) Foreign Application Priority Data

Jul. 11, 2022 (CN) .......................... 202210807951.4

(51) Int. Cl.
*H04N 21/218* (2011.01)
*H04L 67/125* (2022.01)
(Continued)

(52) U.S. Cl.
CPC ....... *H04N 21/21805* (2013.01); *G16Y 10/70* (2020.01); *G16Y 20/40* (2020.01); *H04L 67/125* (2013.01); *H04N 21/25891* (2013.01)

(58) Field of Classification Search
CPC ....... H04N 21/21805; H04N 21/25891; H04N 21/252; G16Y 10/70; G16Y 20/40; H04L 67/125
See application file for complete search history.

(56) References Cited

U.S. PATENT DOCUMENTS 8,221,238 B1 7/2012 Shaw et al.
11,538,336 B1 * 12/2022 Anvari ................... G16Y 40/30
(Continued)

FOREIGN PATENT DOCUMENTS

CN 108650522 A 10/2018
CN 109151598 A 1/2019
(Continued)

OTHER PUBLICATIONS

White Paper on Urban Brain Development, Smart City Standard Working Group of National Beacon Commission, 2022, 59 pages.
(Continued)

*Primary Examiner* — Fernando Alcon
(74) *Attorney, Agent, or Firm* — METIS IP LLC

(57) ABSTRACT

The present disclosure provides a method and Internet of Things system for controlling a public landscape live broadcast in a smart city. The method includes: obtaining a landscape image; transmitting the landscape image to a user platform; determining a general user will through the user platform; the user will including an adjustment advice for the landscape image; determining camera parameters according to the general user will; transmitting the camera parameters to a camera device, which is configured to collect the landscape image; and obtaining a new landscape image according to camera parameters. The IoT system includes the user platform, the service platform, the management platform, the sensing network platform, and an object platform. The method may be implemented by a device for controlling the public landscape live broadcast in a smart city. The method may be operated after reading a computer instruction stored in the computer-readable storage medium.

9 Claims, 7 Drawing Sheets

(51) Int. Cl.
*H04N 21/258* (2011.01)
*G16Y 10/70* (2020.01)
*G16Y 20/40* (2020.01)

(56) References Cited

U.S. PATENT DOCUMENTS

| | | | |
|---|---|---|---|
| 2013/0232263 A1 | 9/2013 | Kelly et al. | |
| 2014/0040930 A1* | 2/2014 | Gates, III | H04N 21/4755 725/13 |
| 2014/0040945 A1* | 2/2014 | Gates, III | G06Q 30/0269 725/34 |
| 2014/0040946 A1* | 2/2014 | Gates, III | H04N 21/812 725/34 |
| 2015/0172634 A1* | 6/2015 | Wheeler | H04N 21/21805 348/47 |
| 2016/0061719 A1 | 3/2016 | Lambert et al. | |
| 2016/0061720 A1 | 3/2016 | Lambert et al. | |
| 2017/0264920 A1* | 9/2017 | Mickelsen | G06V 40/174 |
| 2018/0302601 A1* | 10/2018 | Chen | H04N 21/23412 |
| 2019/0037259 A1* | 1/2019 | Gaffrey | H04N 21/2187 |
| 2019/0082233 A1* | 3/2019 | Love | H04N 21/21805 |
| 2020/0204848 A1* | 6/2020 | Johnson | H04N 7/188 |
| 2021/0160547 A1* | 5/2021 | Baughman | H04N 23/60 |
| 2021/0185363 A1* | 6/2021 | Paiement | H04L 67/131 |
| 2022/0038752 A1* | 2/2022 | Wong | H04N 21/8549 |
| 2022/0131745 A1* | 4/2022 | Dao | H04L 67/125 |
| 2022/0159092 A1* | 5/2022 | Raman | G16Y 30/10 |
| 2022/0279226 A1* | 9/2022 | Stevens | G06N 3/045 |
| 2022/0345754 A1* | 10/2022 | Pollock | H04N 21/2668 |
| 2022/0345755 A1* | 10/2022 | Pollock | G06V 20/41 |

FOREIGN PATENT DOCUMENTS

| | | | | |
|---|---|---|---|---|
| CN | 112351348 A | 2/2021 | | |
| CN | 112616061 A | 4/2021 | | |
| CN | 113423017 A | 9/2021 | | |
| CN | 113613030 A | 11/2021 | | |
| EP | 2799840 A1 | 11/2014 | | |
| EP | 2799841 A1 | 11/2014 | | |
| KR | 102337799 B1 * | 9/2021 | | H04L 67/125 |
| WO | WO-2016119005 A1 * | 8/2016 | | G06F 3/0482 |

OTHER PUBLICATIONS

Han, Zhong-Ming et al., Analyzing Spectrum Features of Weight User Relation Graph to Identify Large Spammer Groups in Online Shopping Websites, Chinese Journal of Computers, 40(4): 939-954, 2017.

First Office Action in Chinese Application No. 202210807951.4 dated Aug. 18, 2022, 17 pages.

Decision to Grant a Patent for Invention in Chinese Application No. 20221080951.4 dated Sep. 1, 2022, 6 pages.

* cited by examiner

700

- 710: Counting a count of audience of landscape image correspond to different user platforms in a preset duration and sending the count of audience to a management platform based on the service platform
- 720: Determining a camera device to be canceled based on the management platform
- 730: Predicting the count of audience of the landscape image collected based on a candidate point through the management platform based on the count of audience corresponding to the landscape image collected by existing camera points
- 740: determining a candidate point whose count of audience satisfies a preset condition as a newly added camera point, and configuring a corresponding camera device based on the newly added camera point

FIG. 7

METHODS AND INTERNET OF THINGS SYSTEMS FOR CONTROLLING PUBLIC LANDSCAPE LIVE BROADCAST IN SMART CITIES

CROSS-REFERENCE TO RELATED APPLICATION

This application claims priority of Chinese Patent Application No. 202210807951.4, filed on Jul. 11, 2022, the contents of which are entirely incorporated herein by reference.

TECHNICAL FIELD

The present disclosure involves a field of the Internet of Things (IoT) and a cloud platform, and specially involves a method and an IoT system for controlling a public landscape live broadcast in a smart city.

BACKGROUND

A public landscape live broadcast may be an important part of the construction of a smart city, which allows citizens to visit various scenic spots without leaving home. However, due to a large count of scenic spots and limited camera collection devices, the visiting needs of all citizens may not be satisfied.

Therefore, it is necessary to provide a method and an IoT system for controlling a public landscape live broadcast in a smart city. While using the IoT and a cloud platform to improve an efficiency of controlling a public landscape live broadcast, the visiting needs of most citizens may be satisfied.

SUMMARY

One of the embodiments of the present disclosure provides a method for controlling a public landscape live broadcast in a smart city. The method may be implemented by a public landscape live broadcast control platform in a smart city. The method includes: obtaining a landscape image based on an object platform; transmitting the landscape image to the corresponding user platform based on a sensing network platform, a management platform, and a service platform in sequence; obtaining at least one user will through the user platform based on a will obtaining strategy and determining a general user will corresponding to the user platform, the at least one user will including an adjustment advice for the landscape image; determining camera parameters of the object platform corresponding to the user platform through the user platform according to the general user will; different object platforms corresponding to different camera devices, and the landscape image played by the user platform being collected by their corresponding object platform; transmitting the camera parameter to the object platform corresponding to the user platform through the service platform based on the management platform, and the sensing network platform in sequence; and obtaining a new landscape image according to camera parameters based on the object platform.

One of the embodiments of the present disclosure provides an IoT system for controlling a public landscape live broadcast in a smart city. The system includes the user platform, the service platform, the management platform, the sensing network platform, and the object platform. The object platform may be configured to obtain the landscape image, and the landscape image may be transmitted to the corresponding user platform based on the sensing network platform, the management platform, and the service platform in sequence, different object platforms corresponding to different camera devices. The user platform may be configured to: play the landscape image, and the landscape image played by the user platform being collected by the corresponding object platform; obtain at least one user will based on a will obtaining strategy; the at least one user will including an adjustment advice for the landscape image; determine a general user will; determine the camera parameters of the object platform corresponding to the user platform through the user platform according to the general user will; transmit the camera parameters to the object platform corresponding to the user platform through the service platform, the management platform, and the sensing network platform; and obtain a new landscape image after the object platform receives the camera parameters based on the camera parameters.

One of the embodiments of the present disclosure provides a device for controlling the public landscape live broadcast in a smart city, which includes at least one processor and at least one memory. The at least one memory may be configured to store a computer instruction, and the at least one processor may be configured to perform at least part of the computer instruction to implement the method for controlling a public landscape live broadcast in a smart city according to any of the above embodiments.

One of the embodiments of the present disclosure provides a non-transitory computer-readable storage medium storing computer instructions, when reading the computer instructions in the storage medium, a computer implements the method for controlling a public landscape live broadcast in a smart city.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein:

FIG. 7 is an exemplary flowchart illustrating an adjusting method of a camera device according to some embodiments of the present disclosure.

DETAILED DESCRIPTION

Figure 1:
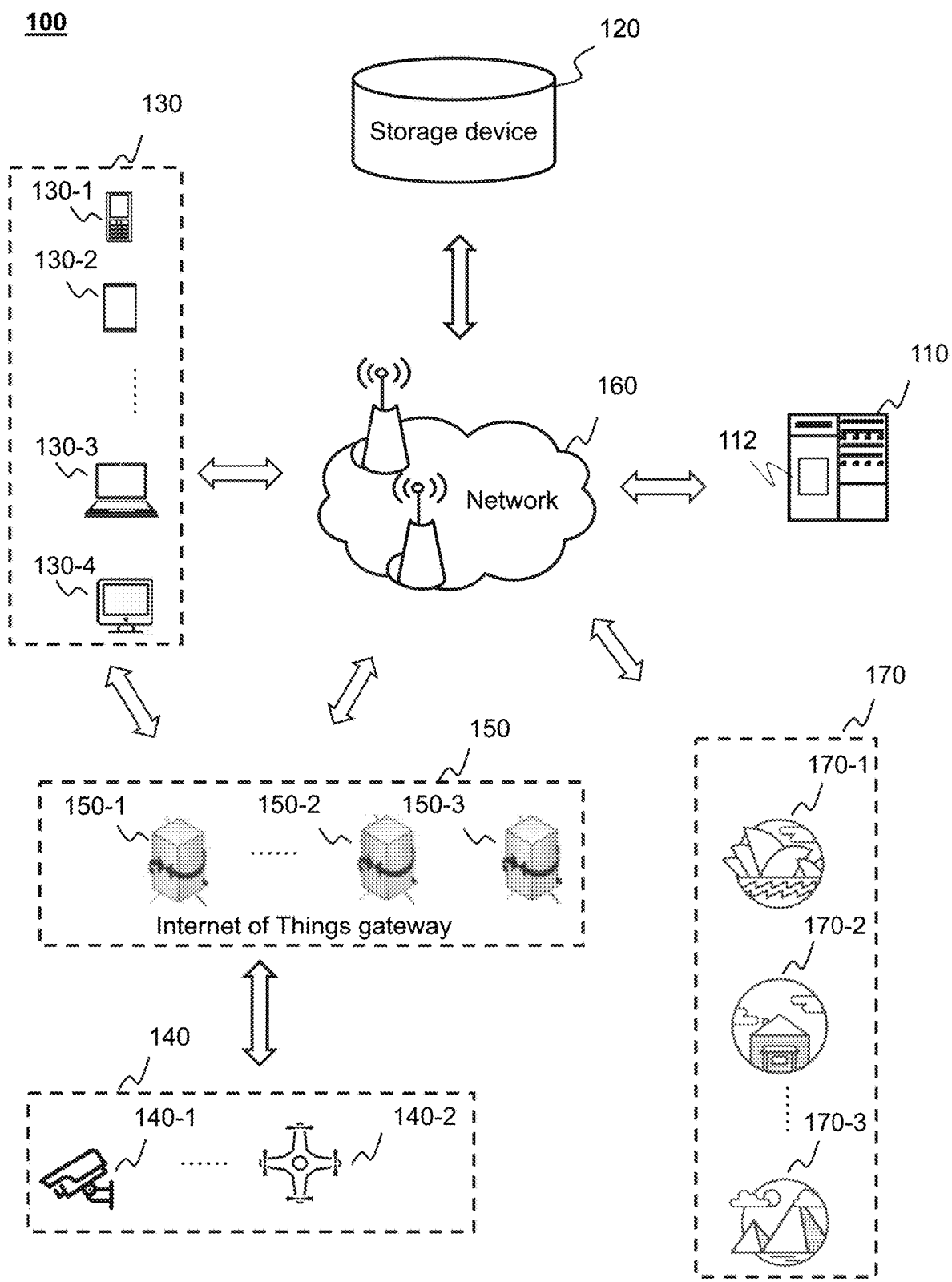
FIG. 1 is a schematic diagram illustrating an application scenario of an IoT system for controlling a public landscape live broadcast in a smart city according to some embodiments of the present disclosure.

In order to illustrate technical solutions of the embodiments of the present disclosure, a brief introduction regarding the drawings used to describe the embodiments is provided below. Obviously, the drawings described below are merely some examples or embodiments of the present disclosure. Those having ordinary skills in the art, without further creative efforts, may apply the present disclosure to other similar scenarios according to these drawings. It should be understood that the exemplary embodiments are provided merely for better comprehension and application of the present disclosure by those skilled in the art, and not intended to limit the range of the present disclosure. Unless obvious according to the context or illustrated specifically, the same numeral in the drawings refers to the same structure or operation.

It should be understood that the terms "system", "device", "unit" and/or "module" used in the specification are means used to distinguish different components, elements, parts, segments, or assemblies. However, these words may be replaced by other expressions if they serve the same purpose.

The terminology used herein is for the purpose of describing particular example embodiments only and is not intended to be limiting. As used herein, the singular forms "a," "an," and "the" may be intended to include the plural forms as well, unless the context clearly indicates otherwise, and the plural forms may be intended to include the singular forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added into the flowcharts. One or more operations may be removed from the flowcharts.

FIG. 1 is a schematic diagram illustrating an application scenario of an IoT system for controlling a public landscape live broadcast in a smart city according to some embodiments of the present disclosure. In some embodiments, an application scenario 100 may include a server 110, a storage device 120, a user terminal 130, a sensing device 140, an IoT gateway 150, a network 160, and landscape images 170.

In some embodiments, the server 110 may be a single server or a server group. The server group may be concentrated or distributed. For example, the server 110 may be a distributed system. In some embodiments, the server 110 may be local or remote. In some embodiments, the server 110 may be implemented on a cloud platform. In some embodiments, the server 110 or a part of the server 110 may be integrated into a sensing device 140.

In some embodiments, the server 110 may include a processing device 112. The processing device 112 may be configured to obtain information, and analyze, process the collected information to perform one or more functions described in the present disclosure. For example, the processing device 112 may obtain a voting information, an count of audience, and a watching duration, etc. of the user terminal 130, and determine a general user will through a weighted calculation. For another example, the processing device 112 may generate camera parameters control strategy based on the general user will, issue a control instruction to the sensing device 140, and control the sensing device 140 to obtain a new landscape image.

In some embodiments, the processing device 112 may include one or more processing engines (for example, a single-chip processing engine or a multi-chip processing engine). As an example, the processing device 112 may include a central processing unit (CPU), an application specific integrated circuit (ASIC), or any combination thereof.

The storage device 120 may be configured to store a data and/or instruction. For example, the storage device 120 may be configured to store the landscape images obtained by the sensing device 140. The storage device 120 may obtain the data and/or instruction from the server 110, the user terminal 130, etc. In some embodiments, the storage device 120 may store the data and/or instruction to be performed or used by the processing device 112 to complete the exemplary method described in the present disclosure.

The user terminal 130 may refer to a terminal that a user uses to play landscape images, input voting information and watching requirements. For example, the user terminal 130 may include but not limited to a smart phone 130-1, a tablet computer 130-2, a laptop computer 130-3, a processor 130-4 and other devices, or any combinations of devices with input and/or output functions. In some embodiments, the user terminal 130 may be one or more users. For example, the users of using the user terminal 130 may include users using the service directly and other relevant users.

The sensing device 140 may refer to a device configured to obtain landscape images. For example, the sensing device 140 may include but not limited to landscape camera device 140-1 and drone camera device 140-2. In some embodiments, the landscape camera device 140-1 may be an infrared camera or a high-definition (HD) digital camera. In some embodiments, the drone camera device 140-2 may be an unmanned aircraft operated by a radio remote control device. For example, the drone camera devices 140-2 may include a multi-rotor drone, an unmanned helicopter, a solar drone, etc. In some embodiments, the sensing device 140 may be configured as one or more object sub-platforms of the IoT, the landscape camera device 140-1 is a sub-platform of the landscape camera device, and the drone camera device 140-2 is a sub-platform of the drone camera device.

The IoT gateway 150 may refer to a data channel and gateway of the user terminal 130 and/or the sensing device 140 for uploading monitoring data. For example, the IoT gateway 150 may include but not limited to an IoT gateway 150-1 of the landscape camera device, an IoT gateway 150-2 of the drone camera device, and an IoT gateway 150-3 of the user terminal. In some embodiments, the landscape camera device 140-1 may upload the landscape images through the IoT gateway 150-1 of the landscape camera device. The drone camera device 140-2 may upload the landscape images through the IoT gateway 150-2 of the drone camera device. The user terminal 130 may upload the landscape images through the IoT gateway 150-3 of the user terminal. In some embodiments, the server 110 may issue controlling instructions through the IoT gateway 150-1 of the landscape camera device and control the operation of the landscape camera device 140-1. In some embodiments, the server 110 may issue control instructions through the IoT gateway 150-2 of the drone camera device and control the operation of the drone camera device 140-2.

The network 160 may provide channels for information and/or data exchange. In some embodiments, the server 110, the storage device 120, the user terminal 130, the sensing device 140, the IoT gateway 150, and the landscape images 170 may exchange information through the network 160. For example, the server 110 may receive voting information sent by the user terminal 130 through the network 160. For another example, the server 110 may obtain the landscape image information uploaded by the sensing device 140 through the network 160 and store the information in the storage device 120.

The landscape images 170 may refer to screens of various landscape collected based on the sensing device 140. For example, the landscape images may include various natural landscape images or cultural landscape images. In some embodiments, the landscape images 170 may be landscape pictures collected by the sensing device 140 based on a certain camera angle, and different landscape images 170 may correspond to the same landscape or different landscape. As an example, the landscape images 170 may include landscape images 170-1 collected from the front of the rockery, landscape images 170-2 collected from the back of the rockery, and landscape images 170-3 collected from the side of the rockery. For another example, the landscape images 170 may include landscape images collected from a zoo 170-1, landscape images 170-2 collected from a natural scenic area, and landscape images 170-3 collected from the urban architectural landscape. For different landscape images obtained from different landscapes or angles, their landscape obtaining parameters may be different, so that the obtained landscape effects may satisfy the realistic needs of the user.

It should be noted that the application scenario is only provided for the purpose of explanation, and not intend to limit the range of the present disclosure. For those skilled in the art, a variety of modifications or changes may be made according to the description of the present disclosure. For example, the application scenarios may also include databases. For another example, application scenarios may achieve similar or different functions on other devices. However, these changes and modifications will not deviate from the range of the present disclosure.

The IoT system is an information processing system that includes a part or all of an object platform, a sensing network platform, a management platform, a service platform. The management platform may realize the general planning and coordination of the connection and cooperation between various function platforms (such as the sensing network platform and the object platform), and gather information of the IoT operation system, which may provide perception management and control management functions for the IoT operation system. The sensing network platform may connect the management platform and the object platform, which may have functions of perception information sensing communication and controlling information sensing communication. The object platform may be a function platform for generating the perception information and performing the controlling information. The service platform refers to a platform providing input and output services for the user. The user platform refers to a platform dominated by the user, including the platform obtaining the needs of the users and feedbacking information to the user.

The processing of information in the IoT system may be divided into a processing flow of perception information and a processing flow of controlling information. The controlling information may be information generated based on the perception information. The processing of the perception information may include obtaining perception information by the object platform and transmitting the perception information to the management platform through the sensing network platform. The controlling information may be issued by the management platform to the object platform through the sensing network platform, thereby realizing the control of the corresponding object.

In some embodiments, when applying the IoT system to urban management, it may be called as the IoT system in a smart city.

Figure 2:
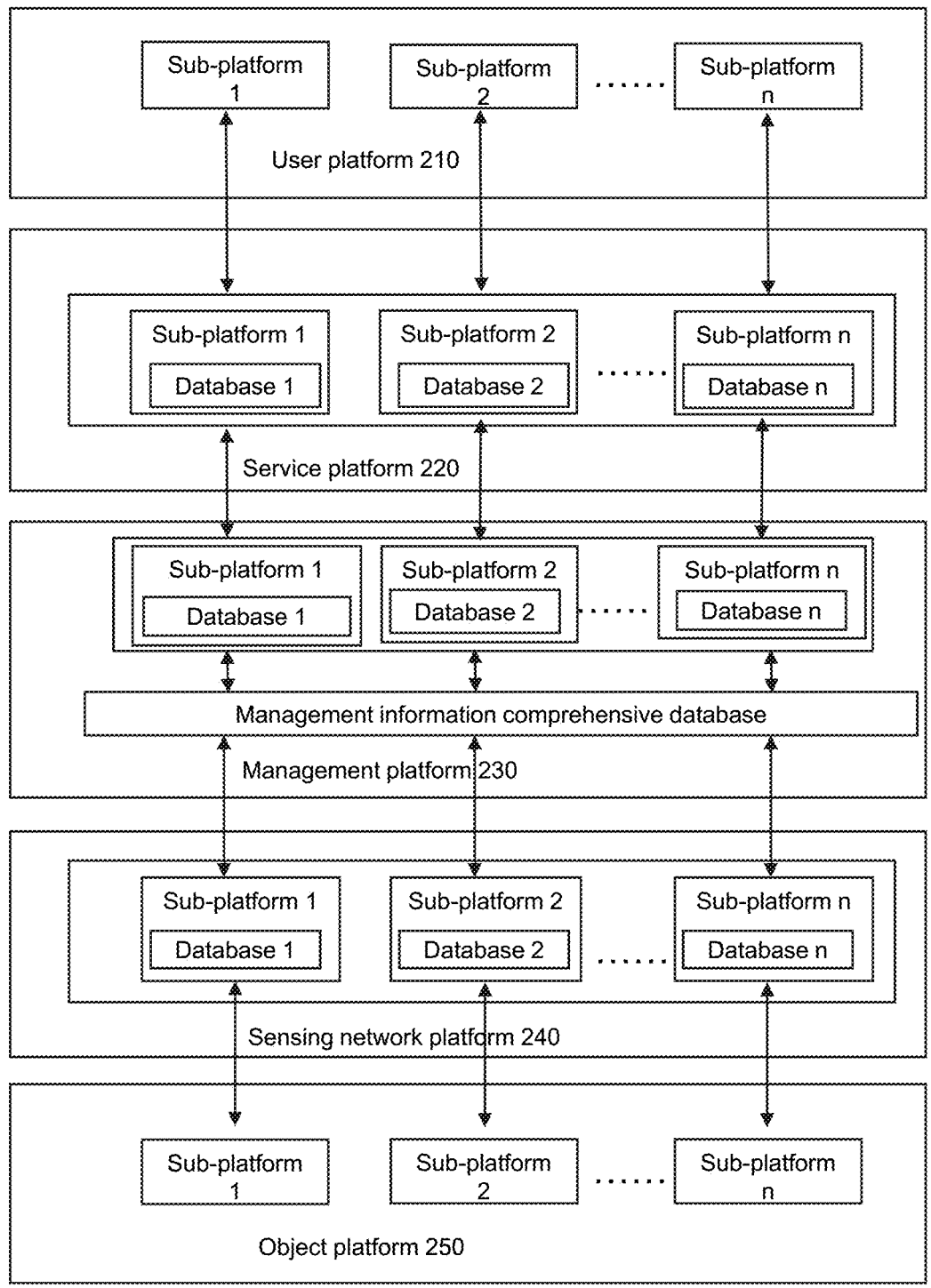
FIG. 2 is an exemplary schematic diagram illustrating an IoT system for controlling a public landscape live broadcast in a smart city according to some embodiments of the present disclosure.

FIG. 2 is an exemplary schematic diagram illustrating an IoT system for controlling a public landscape live broadcast in a smart city according to some embodiments of the present disclosure.

As shown in FIG. 2, an IoT system for controlling a public landscape live broadcast in a smart city may include a user platform 210, a service platform 220, a management platform 230, a sensing network platform 240, and an object platform 250.

The user platform 210 refers to a platform dominated by a user, including a platform obtaining the user needs and feeding back information to the user. For example, the user platform may watch landscape images through a user terminal (for example, the user terminal 130). For another example, the user platform may obtain the voting information of the user through the user terminal, thereby controlling a landscape camera device (for example, a landscape camera device 140-1) and/or a drone camera device (for example, a drone camera device 140-2). For another example, the user platform may feedback information such as a watching duration of the user to the server 110.

In some embodiments, the user platform may be configured to obtain at least one user will based on a will obtaining strategy, determine a general user will corresponding to the user platform, and determine camera parameters of the object platform corresponding to the user platform according to the general user will. Different object platforms correspond to different camera devices, and the landscape images played by the user platform may be collected by their corresponding object platform. The at least one user will may include an adjustment advice for the landscape images. More descriptions about determining the general user will may be referred to the contents of operation 330.

The service platform 220 refers to a platform providing input and output services for the user. The service platform may be configured to transmit camera parameters to the object platform corresponding to the user platform based on the management platform, and the sensing network platform in sequence. For example, the service platform may obtain voting information sent by the user through the user platform and feedback a voting result to the user. In some embodiments, the service platform may include a plurality of service sub-platforms, and the service platform adopts different service sub-platforms to perform data storage, data processing, and/or data transmission on data sent by different user platforms.

The management platform 230 may be a platform realizes the general planning and coordination of the connection and cooperation between various function platforms, and gathers information of the IoT operation system, which may provide perception management and control management functions for the IoT operation system. For example, the management platform may obtain all voting information of the user of a preset area within a current period, determine camera parameters based on the general user will, and adjust the landscape images obtained by the object platform 250.

In some embodiments, the management platform may include a management information comprehensive database (i.e., a general management database) and a plurality of management sub-platforms. In some embodiments, a sub-database may be configured for each corresponding management sub-platform to store data and instruction received by the corresponding management sub-platform.

The sensing network platform 240 refers to a function platform that connects the management platform and the object platform and performs a perception information sensing communication and a controlling information sensing communication. In some embodiments, the sensing network platform may be configured as an IoT gateway (e.g., an IoT gateway 150). It may be used to establish a channel for uploading the perception information and issuing the controlling information between the user terminal (e.g., a user terminal 130) and/or the sensing device (e.g., a sensing device 140) and the management platform.

In some embodiments, the sensing network platform 240 may be configured as an independent structure. The independent structure refers to that the sensing network platform adopts different sensing network sub-platforms for data storage, data processing, and/or data transmission on the data of different object platforms. For example, the sensing network sub-platforms may form a one-to one correspondence with the plurality of object platform. The sensing network platform 240 may obtain the landscape images uploaded by each object platform and upload the landscape images to the management platform.

The object platform 250 refers to a function platform for generating the perception information and finally performing the controlling information. In some embodiments, the object platform may be configured as a landscape camera device and a drone camera device. In some embodiments, the object platform may be configured to obtain the landscape images and transmit the landscape images to the corresponding user platform based on the sensing network platform, the management platform, and the service platform in sequence. More descriptions about landscape images may be referred to the relevant contents of operation 310. In some embodiments, the object platform may be further configured to obtain new landscape images according to camera parameters. In some embodiments, the object platform may be classified as a plurality of object platforms based on different perception devices, and each object platform corresponds to a watching position to perform landscape images collection and data collection.

Some embodiments of the present disclosure also provide a computer- readable storage medium storing computer instructions, when reading the computer instructions in the storage medium, a computer implements the method for controlling a public landscape live broadcast in smart city.

It should be noted that the above descriptions of the IoT system for controlling public landscape live broadcast in smart city and its internal modules are only to facilitate descriptions, and not limit the present disclosure within the range of the embodiments. It is understandable that for those skilled in the art, after understanding the principle of the system, each module may be combined arbitrarily, or may construct sub-systems to connect with other modules under the condition of not deviating from the principle. In some embodiments, the user platform 210, the service platform 220, the management platform 230, the sensing network platform 240, and the object platform 250 disclosed in FIG. 2 may be different modules in a system or may be one module to implement the functions of the above two or more modules. For example, the modules may share one storage module, or each module may further have their own storage modules. Such deformations are within the protection range of the present disclosure.

Figure 3:
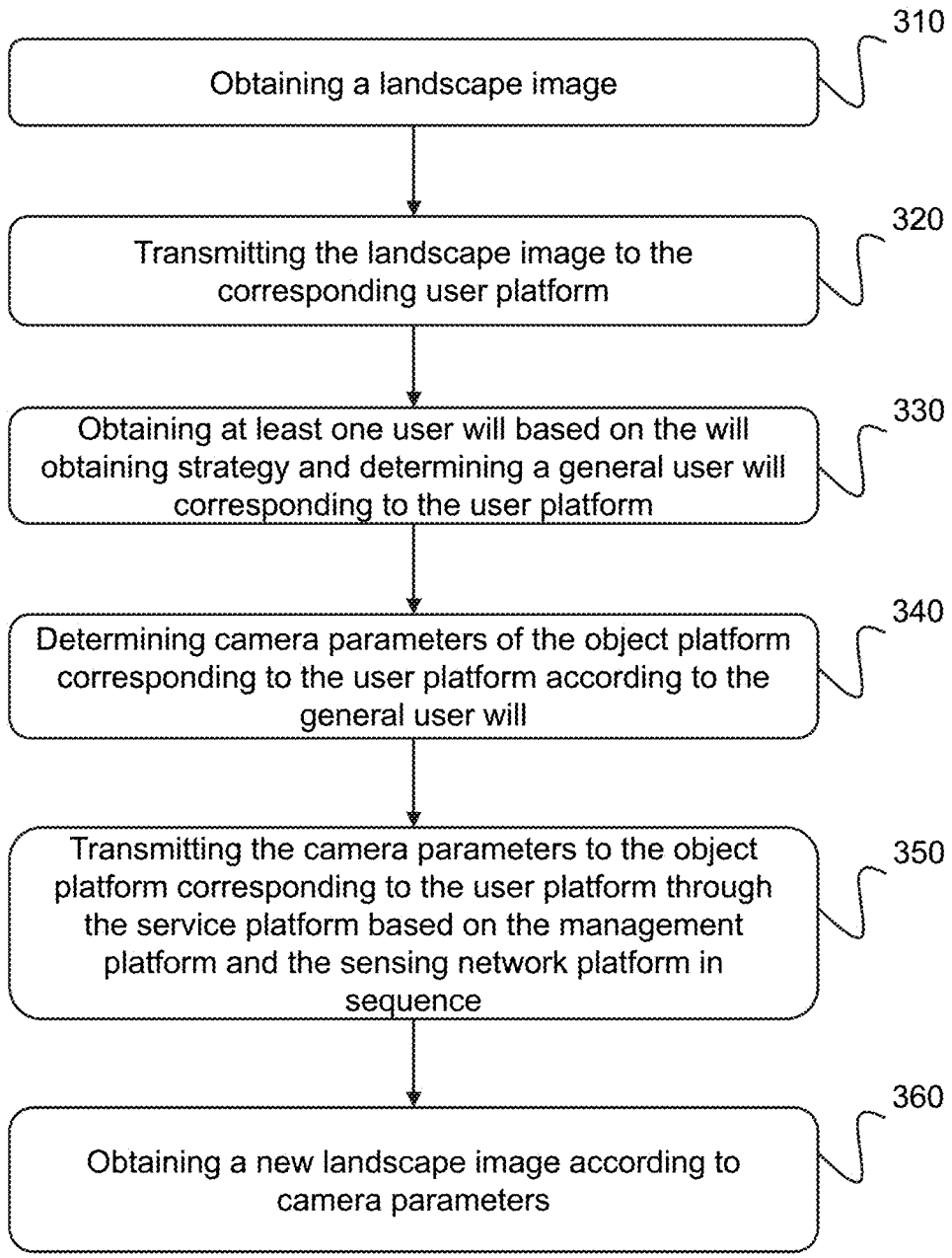
FIG. 3 is an exemplary flowchart illustrating a method for controlling a public landscape live broadcast in a smart city according to some embodiments of the present disclosure.

FIG. 3 is an exemplary flowchart illustrating a method for controlling a public landscape live broadcast in a smart city according to some embodiments of the present disclosure. In some embodiments, a flow 300 may be performed by an IoT system 200 for controlling a public landscape live broadcast in a smart city.

As shown in FIG. 3, the flow 300 includes the following operations.

In 310, obtaining a landscape image. In some embodiments, the operation 310 may be performed by the object platform 250.

The landscape may refer to the scene of a certain area that is used to the public presentation. For example, the landscape may include a public space of activity (such as a park, a zoo), and a cultural scenic area (such as the Forbidden City, the Great Wall, etc.). In some embodiments, the landscape may further include scenes of a showpiece (such as a museum collection, etc.), a landmark facility building (such as the Monument to the People's Heroes), and other specific items or buildings.

In some embodiments, to facilitate civil service, the landscape may further include a working scene of government departments or social service agencies. For example, the landscape may include a working scene of government office centers, rescue stations, and courts, etc.

The landscape images may be the specific scene of the landscape. For example, the landscape images may include real-time images of buildings captured from specific angles and at specific positions. For another example, the landscape images may include displaying images of handicrafts on the display stand.

In some embodiments, the landscape images may be obtained through a sensing device (such as a sensing device 140) built-in in the object platform. For example, the sensing device may obtain real-time video files and real-time audio files of a specific landscape as the landscape images of the landscape. For another example, the sensing device may obtain video files of the specific landscapes (such as collections) and store them in a storage device (such as a storage device 120), so that when a user needs, the corresponding video files may be called and taken as the landscape images.

In some embodiments, the landscape images may be determined based on the needs of the user. For example, the user platform may correspond to various landscapes, and the user may determine the landscape watched by the user through selecting the user platform (such as a live broadcast room of each landscape).

In 320, transmitting the landscape image to the corresponding user platform.

In some embodiments, the landscape image obtained by the object platform may be sent to the corresponding user platform based on the sensing network platform, the management platform, and the service platform in sequence. For example, the user platform may correspond to the landscape identification information (such as landscape identification (ID)). After obtaining the landscape images, the user platform may determine the user platform corresponding to the landscape (such as the live broadcast room of the landscape) according to the ID of the landscape and transmit the landscape images along a transmission path to the corresponding user platform.

In some embodiments, the sensing devices may be deployed at a plurality of points of the public landscape. The image taken by each sensing device corresponds to a sub-image, and a landscape image of the object may be composed of a plurality of sub-images. For example, the landscape images may include a live broadcast image of a trial of a civil case that can be made public. The landscape image may include landscape sub-images such as judges, defense lawyers of both parties, both parties, and recorders, etc.

In some embodiments, each sub-image may be presented in the corresponding user platform according to preset presenting rules and the user needs. For example, each sub-image may be presented in the corresponding user platform according to a preset presenting area, the sub-image with largest presenting area may be taken as a main landscape. For another example, the user may adjust the presenting area of each sub-image by itself. Exemplarily, the preset main landscape of live broadcast image of the trial of the civil case may be the sub-image of the judge. The user may adjust the presenting area of each sub-image in the user platform by itself to redetermine the main landscape or hide a part of the sub-images.

In some embodiments, the user platform may only present a part of the sub-images. For example, when the user platform presents the main landscape in the sub-images first in response to the user request to present the landscape images. The user may take the initiative to adjust the presentation of each sub-image. In some embodiments, the user platform may further configure different sub-images in different threads. After the user enters the landscape live broadcast, images of the main landscape may be presented first, and other sub-images may be presented in other threads.

In some embodiments, the main landscape may be determined according to an actual watching condition of each user platform. For example, the user platform may determine the sub-image with most audiences as the main landscape based on the count of audience of each sub-image. For another example, the sub-image with longest average stay time may be determined as the main landscape based on the average stay time of the audiences in each sub-image. For another example, each index of the actual watching condition may be weighted to determine the main landscape.

In 330, obtaining at least one user will based on the will obtaining strategy and determining a general user will corresponding to the user platform. In some embodiments, operation 330 may be performed by the user platform 210.

The user will may be the user's active feedback advices on the landscape images. The user will include an adjustment advice for the landscape images. In some embodiments, the user will may include various types of adjustment advices. For example, the user will may include adjustment advices for each landscape and adjustment advices for the sub-images of the landscape.

The adjustment advice may refer to adjustment suggestions for the landscape images. For example, the adjustment advices may include suggestions on the increase or decrease of the sensing devices, suggestions on the shooting condition of the landscape images, and suggestions on the landscape images the user want to watch, etc. Exemplarily, the user's adjustment advices may be embodied as the hope of image amplification, the adjustment of angle of the camera, and the hope to see the images of "feeding food", etc.

The general user will may be the statistical result of the will of all users who currently watch the landscape images. Exemplarily, the user platform may count the user will, analyze the adjustment advices on the images of the giraffe house in the zoo landscape, and take playing the images of the giraffe house as the general user will.

In some embodiments, the user platform may be provided with a user feedback button, and the user may feedback the user will through the user feedback button. The feedback button may be configured with feedback options and a text input box. The feedback options may list common adjustment advices, and the text input box may be used to enter a text feedback. When the user feedbacks the user will through the feedback button, the user platform may determine the user will according to the selection of the feedback options and the text feedback.

The will obtaining strategy may refer to the mode of determining the general user will. For example, the will obtaining strategy may include a statistical strategy, the user platform 210 may process the user will based on the statistical strategy to determine the general user will. Exemplarily, for a specific landscape image, the user will may include adjustment advices of users A, B, and C. The user A wants to enlarge the images, the user B and user C want to shrink the images, then the general user will may include that one person wants to enlarge the images and two persons want to shrink the images.

In some embodiments, the will obtaining strategy includes a will obtaining frequency.

The will obtaining frequency may refer to the count of times of determining the general user will in a unit time. For example, the will obtaining frequency may be 5 min/time, then the corresponding user will may be obtained every 5 minutes, and the general user will may be determined based on the user will.

In some embodiments, the will obtaining frequency may be related to at least one of a count of audience and an audience activity of the landscape image.

The count of audience of the landscape image may refer to the count of audiences watching specific landscape images or sub-images. For example, the count of audiences may be determined through a count of the users of the user platforms watching each landscape image. In some embodiments, the count of audiences of the landscape images may further refer to the count of active people, that is, the count of audiences of the landscape images does not include the count of users who watch the landscape images but does not perform other operations for a long time (such as the user does not operate in a watching terminal for 20 minutes).

The audience activity may refer to the participation degree of the user during the playing process. The audience activity may be determined through the count of interactions (such as comments, likes, rewards, adjustment advices feedback, etc.) between the user and the landscape live broadcast. The greater the count of interactions is, the higher the audience activity may be.

In some embodiments, the greater the count of audiences of the landscape images is and the higher the audience activity is, the smaller the advice obtaining frequency may be. For example, the count of audiences is 10,000, and the audience activity is relatively high (e.g., more than 500,000 likes per minute), then the advice obtaining frequency may be once every 1 minute. The count of audiences is 100, and the audience is relatively low (e.g., less than 10 likes per minute), then the advice obtaining frequency may be once every 10 minutes.

In some embodiments, the general user will may further include a general adjustment advice. The general adjustment advice may be an adjustment advice on the processing of the landscape images. For example, the general adjustment advice may be reflected as the most supported adjustment advice in all adjustment advices. Exemplarily, the general user will may include: when one person wants to enlarge the images and two persons want to shrink the images, the total count of persons who want to shrink the images is greater than that of persons who wants to enlarge the images, then the general adjustment advice may be shrinking the images.

In some embodiments, the will obtaining strategy includes a weight rule of the user will. The user platform may perform processing on each adjustment advice based on the weight rule of the user will, and determine a general adjustment advice according to the various weighted adjustment advices. More descriptions about the weight rule of the user will may be referred to the relevant contents of FIG. 4.

In 340, determining camera parameters of the object platform corresponding to the user platform according to the general user will. In some embodiments, operation 340 may be performed by the user platform 210.

In some embodiments, different object platforms correspond to different camera devices, and the landscape images played by the user platform may be collected by its corresponding object platform. When the user platform adjusts the landscape images according to the general user will, the user platform may adjust camera parameters of the corresponding object platform. The corresponding relationship between the landscape images and the camera devices may be pre-stored in the IoT system 200 for controlling a public landscape live broadcast in a smart city. When adjusting the landscape images, the camera device may be determined directly according to the corresponding relationship (such as the unique ID of the camera device).

Camera parameters may refer to parameters when the camera device shoots the landscape images. For example, the camera parameters may include a camera ID, a camera type, a camera location, a camera angle, a camera content, a zoom ratio, an exposure and white balance, a resolution, and other relevant parameters.

When determining camera parameters according to the general user will, the user platform may determine the corresponding camera parameters according to the specific content of the general adjustment advice. For example, when the general adjustment advice includes enlarging the images, it may be implemented by adjusting the zoom ratio and/or the camera location. When the general adjustment advice includes increasing resolution, it may be implemented by changing the camera lens or changing the camera device.

In some embodiments, when the current camera device cannot satisfy the general user will to determine the camera parameters, the user platform may request for changing the camera device to satisfy the camera parameters. For example, when the current camera device cannot satisfy the definition requirements of the camera parameters, the user platform may request for changing a camera device with higher resolution.

In 350, transmitting the camera parameters to the object platform corresponding to the user platform through the service platform based on the management platform and the sensing network platform in sequence.

In some embodiments, when the camera parameters are determined, the user platform may transmit the camera parameters to the object platform corresponding to the user platform through the service platform based on the management platform, and the sensing network platform in sequence. For example, the user platform may correspond to the camera device (e.g., the user platform may be bound to the unique identification code of the camera device), and the user platform may send the camera parameters to the corresponding object platform according to the corresponding relationship.

In some embodiments, the camera parameters may include the camera parameters of a plurality of camera devices. For example, the camera parameters may include the camera parameters of the landscape images and each sub-image.

In some embodiments, when the current camera devices cannot satisfy the corresponding camera parameters, the object platform may change the camera device. For example, the object platform may cancel the corresponding relationship between the camera device and the user platform and establish a relationship between the user platform and the camera device that satisfies the camera parameters to collect and transmit the corresponding landscape images.

In 360, obtaining a new landscape image according to camera parameters. In some embodiments, the operation 360 may be performed by the object platform 250.

In some embodiments, the new landscape image may be the landscape image obtained by the camera device after updating the camera parameters.

Based on the method for controlling a public landscape live broadcast in a smart city provided by some embodiments of the present disclosure, the general user will may be determined according to statistics and analysis of the user will, so as to adjust the landscape images. In this way, the user's satisfaction of the public landscape live broadcast may be improved, and the user will of most users may be considered.

Figure 4:
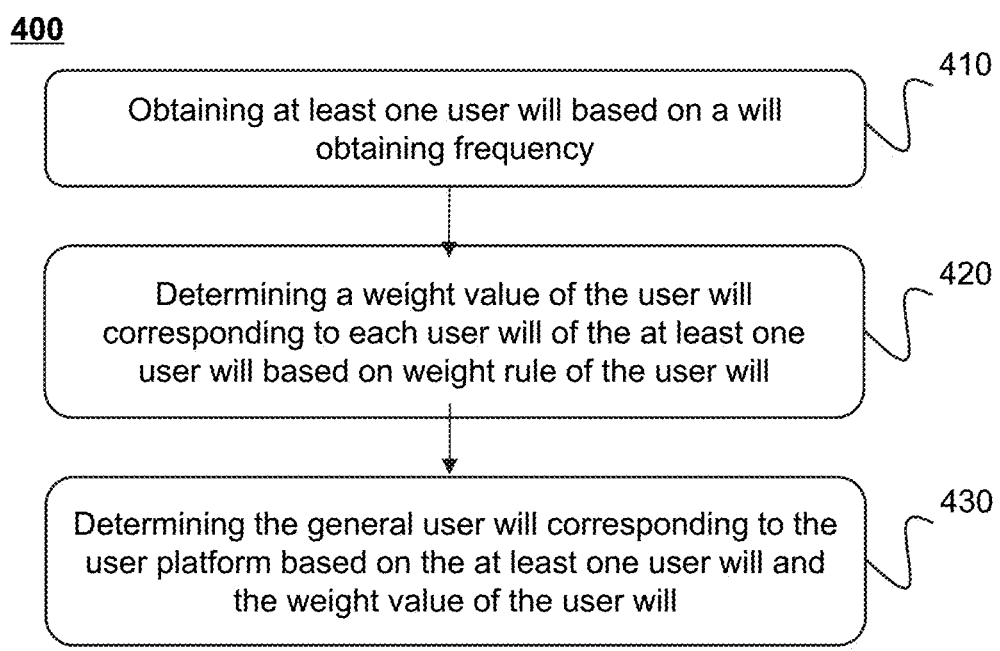
FIG. 4 is an exemplary flowchart illustrating determining a general user will according to some embodiments of the present disclosure.

FIG. 4 is an exemplary flowchart illustrating determining a general user will according to some embodiments of the present disclosure. In some embodiments, flow 400 may be performed by the user platform 210.

As shown in FIG. 4, the flow 400 may include the following steps.

In 410, obtaining at least one user will based on a will obtaining frequency.

In some embodiments, a user platform may determine a will obtaining period according to the will obtaining frequency and take the will obtaining period as a statistical range to count the user will obtained within the will obtaining period. The will obtaining period may be the interval of the counting of the user will or the reciprocal of the will obtaining frequency. For example, the will obtaining frequency may be obtained once every 5 minutes, then the will obtaining period may be 5 minutes.

In 420, determining a weight value of the user will corresponding to each user will of the at least one user will based on weight rule of the user will.

The weight value of the user will may reflect the influence of an adjustment advice in the general adjustment advice. In some embodiments, the weight may be any value between 0-1. In some embodiments, the weight value of the user will may include the weight of each adjustment advice in the user will.

The weight rule of user will may refer to the method of determining the weights of the adjustment advices. The weight rule of user will may process the relevant data of the user wills to determine the weight values of the user wills. For example, the weight rule of user will may determine the weight value of user will according to the identity of each user. For general audiences (such as users without special identities), the weight value of their wills may be conventional values (such as 0.5). For audiences with special identities, the weight value of their wills may not be conventional data. For example, for officially invited feedback personnel, the weight value of their wills may be greater than the conventional values (such as 1). For those who disrupt the order of the live broadcast room, the weight value of their wills may be less than the conventional values (such as 0.1 or 0).

In some embodiments, the weight rule of the user will may include a watching duration rule. In the watching duration rule, the weight value of the user will may be related to the user watching duration of the landscape images. That is, the longer the user watching duration of the landscape image is, the higher the weight value of the user will may be. For example, the user platform may take the watching duration of the audiences watching the landscape image within a preset period as the benchmark, the weights of other users may be converted according to their watching durations. Exemplarily, the preset period may be 8:00-9:00, and the longest duration for watching the landscape images may be 1 hour during the preset period. Then the weight value of the will of the audiences who has watched the landscape images for 1 hour may be configured as 1. The weight values of the will of other audiences may be configured as watching duration/1 hour. For example, if the watching duration is 0.5 hour, the weight value of the wills may be 0.5.

In some embodiments, the weight rule of the user will may include an execution ratio rule. In the execution ratio rule, the weight value of the user will may be related to the ratio of successful execution of the user will. That is, the higher the ratio of the successful execution of the user will is, the higher the weight value of the user will may be.

The successful execution of the user will may refer to that the adjustment advices previously proposed by the user or the user wills are accepted by the user platform and taken as the general user will. The ratio of successful execution of the user will may refer to the ratio of accepted adjustment advices or the user will to all the adjustment advices proposed by the user or the total user will.

In some embodiments, the weight rule of the user will may include an anti-community weight rule. The weight value of the will of the anti-community weight rule may be an anti-community weight value obtained based on a connection map. The anti-community weight rule may refer to the weight rule to avoid the user groups influencing the result. The anti-community weight rule may be implemented by reducing the weights of similar users in the same group. More contents about the anti-community weight rule may be referred to FIG. 5 and its related contents.

In some embodiments, the user platform may determine a will obtaining strategy based on a first prediction model. For example, the user platform may input various will obtaining strategies into the first prediction model to determine the influences of executing each candidate will obtaining strategy on the count of audiences, so as to determine a target will obtaining strategy from the candidate will obtaining strategies. The first prediction model may be a machine learning model. More descriptions of the first prediction model may be referred to FIG. 6 and its related contents.

In 430, determining the general user will corresponding to the user platform based on the at least one user will and the weight value of the user will.

In some embodiments, the user platform may obtain weighted user will by weighting the user will based on the weight values of the user will, and determine weighted results of various types of the user will through each weighted user will, and take the user will with the greatest weighted result as the general user will. For example, the user will of 5 users may be to indent a focal length, and the user will of 10 users may be to lengthen the focal length. After weighting the user will, the weighted result may be that 4.2 users want to indent the focal length, and 7.1 users want to lengthen the focal length, so lengthening the focal length may be chosen as the general user will.

Based on the method of determining the general user will provided by some embodiments of the present disclosure, the influence of each user in the general users may be quantitatively analyzed through its weight, and the user will of each user may be fully considered at the same time. As a result, the general user will may reflect the will of most users, thereby improving the effect of the landscape live broadcast.

Figure 5:
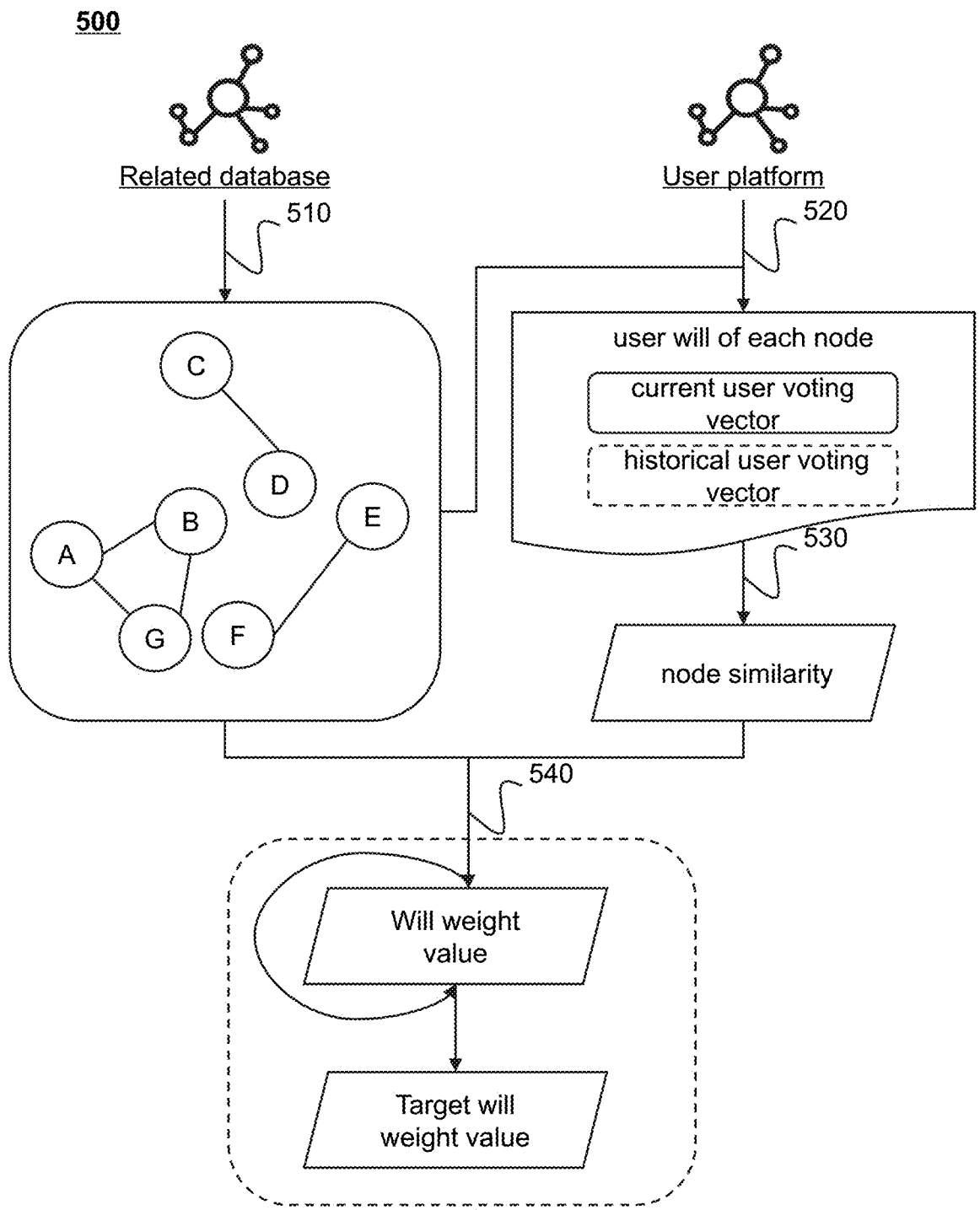
FIG. 5 is an exemplary flowchart illustrating determining a will weight value according to some embodiments of the present disclosure.

FIG. 5 is an exemplary flowchart illustrating determining weight value of the user will according to some embodiments of the present disclosure. In some embodiments, the flow 500 may be performed by the user platform 210.

As shown in FIG. 5, the flow 500 may include the following operations.

In 510, obtaining a connection map, which includes nodes and edges between the nodes.

The connection map may refer to a database with a graph structure. The connection map may include the nodes, node features, the edges between nodes, and edge features.

The nodes may correspond to each of users. As shown in FIG. 5, the connection map may include nodes A-G, and each node may correspond to each of the users watching a landscape live broadcast through the user platform. In some embodiments, the connection map may include the corresponding nodes of all users who watches the landscape live broadcast through the user platform at present and in history. In some embodiments, to determine a current general user will, the users who currently propose the user will may be extracted from all users as the nodes of the connection map.

In some embodiments, a node may include node features. The node features may reflect the related information of the users. For example, the node features may include an address, a working unit, a social media interaction, and a watching habit, etc.

In some embodiments, the node may be determined by the user's identification information (such as the user's ID, an ID number, a mobile phone number, etc.), and related data may be called from relevant databases (e.g., social platforms, government databases, etc.) according to the user's identification information as the node features. For example, when the user enter the public landscape live broadcast, the IoT system for controling a public landscape live broadcast in a smart city may obtain the user's ID from the user platform (such as the social network that the user logged in), and request the corresponding related data (such as a mobile phone number, a location, a working unit, a social software usage, etc.) from the social network, so as to determine the node features.

The edge may reflect the mutual effects of the nodes connected. For example, the users correspond to the two nodes connected by the edge may be affected by each other, and the will of both users may be similar or the same. As shown in FIG. 5, the connection map may have edges Aft BG, AG, CD, EF, which may indicate that the user will of the users A, B, and G may be affected by each other and may be the same or similar, the user will of the users C and D may be affected by each other and may be the same or similar, and the user will of the users E and F may be affected by each other and may be the same or similar.

The edge features may reflect a mutual influence between nodes. For example, the edge features may reflect the possibility of mutual influence between the nodes. In some embodiments, the edge features may be featured by a closeness between the nodes. The closeness may be determined through a degree of similarity of the node features (or partial features) of the two nodes.

In some embodiments, the edge features may include a general closeness, an address closeness, a degree of social media interaction, a working unit closeness, and a watching habit similarity. In some embodiments, the edge features may further be described through a similarity of historical user will between nodes. The similarity of the historical user will may be the similarity between the user will provided by each node in a historical will obtaining period.

The address closeness may be determined by determining whether the locations of the above nodes are consistent. For example, a "consistent location" may indicate that the two nodes are in the same community, the same building, the same unit, and other situations, and the address closeness may be different according to different situations. For another example, the address closeness of nodes located in the same unit may be greater than that of the nodes located in the same community.

The degree of social media interaction may be determined according to the count of social media interactions between the two nodes. The higher the proportion of likes and comments is, the higher the degree of social media interaction is.

The working unit closeness may be determined through the similarity of the working units and time of working together of the two nodes. The longer the time of working together of the two nodes in the same working unit, the higher the working unit closeness is. The time of working together may be determined according to an entry time, and the working unit of the nodes may be determined according to the social insurance paid by the nodes.

The watching habit similarity may be determined through the historical watching records of the two nodes. The higher the similarity of the historical watching records is, the higher the watching habit similarity is.

The general closeness may be a statistical result determined through performing statistical methods like weighted summing, averaging, etc. on the address closeness, the degree of social media interaction, the working unit closeness, and the watching habit similarity.

In some embodiments, when determining the connection map, the nodes of the connection map may be firstly constructed according to the users, then each node may be traversed and the general closeness between each node may be determined according to the node features, and edges may be constructed between nodes whose general closeness is greater that a threshold. The various types of closeness may be used as the edge features of corresponding edges.

In 520, obtaining the user will of each node based on the connection map.

The user will may refer to the user will of the users corresponding to each node in the connection map. For example, the user will of the nodes may include the user will of the corresponding user in a current will obtaining period. In some embodiments, the user will of each node may further include the historical user will of the corresponding user in the historical data (such as in the historical will obtaining period).

In some embodiments, the user will may be described by a voting vector. The voting vector may include a plurality of elements and attributes of the corresponding elements. The elements may correspond to the various user will, and the corresponding element values may be the specific situations of the corresponding will.

In some embodiments, the various user will may refer to various adjustment modes of landscape images, for example, enlarging/shrinking the landscape images, whether to change the content of the landscape images (other landscape images that the users want to see). The specific meaning of the elemental values may be related to the adjustment modes of the corresponding images. For example, when the element represents enlarging/shrinking landscape images, the corresponding element value may include −2, −1, 0, 1, 2, 0. 0 indicates that the images are not changed, the positive counts indicate indenting the focal length, and the negative counts indicate lengthening the focal length, and the absolute values of the elemental values may reflect the degree of change.

In some embodiments, the user will of each node may include a current user voting vector and a historical user voting vector. The current user voting vector may be a voting vector determined based on the user will of the user corresponding to the node in the current will obtaining period. The historical user voting vector may be a voting vector determined based on the historical data (such as the user will of the current landscape images in the historical will obtaining period) of the user corresponding to the node.

In some embodiments, the various user will may be represented by votes on different options. Each voting may be regarded as choosing one or more from the plurality of options, and each option may be represented by a number. For example, "1" represents choosing the first option, "2" represents choosing the second option, etc. Exemplarily, in a certain will obtaining period, the user will may include: option 1 being enlarging the landscape images, option 2 being shrinking the landscape images, option 3 being to not change the landscape images. The user voting vector may include the option vote of the user in each will obtaining period. For example, the user voting vector may include the user's last five option votes, then the voting vector may be a vector of five elements, and each element corresponds to a vote. Exemplarily, when the user voting vector V is (1, 2, 4, 1, 3), it indicates that the user's last five votes may be: first potion, second option, fourth option, first option, third option.

In some embodiments, votes for different options may be determined based on statistics of the user will. For example, specific will of the various types of user will of the users may be counted, and each type of user will may be taken as a vote, and the corresponding specific will may be taken as the corresponding option. In some embodiments, votes for different options may further be determined based on the user will collected periodically by the user platform. For example, the user platform may periodically pop up a user will questionnaire, the questionnaire may include at least one vote and its corresponding options. The user may fill in the questionnaire to determine the options of the vote of the user.

In 530, determining a will similarity between the nodes based on the user will of each node.

The will similarity between the nodes may refer to the similarity of the user will between the nodes with edges in the connection map.

In some embodiments, the will similarity between the nodes may be determined according to the distances of the voting vectors between the nodes. For example, the will similarity between the nodes may be inversely proportional to the distances of the voting vectors between the nodes. The farther the distance of the voting vector is, the smaller the similarity is.

In some embodiments, the will similarity between the nodes may be taken as a node similarity. In some embodiments, the node similarity may be determined based on a standardized function. A function value of the standardized function may be within the a range of [0,1]. When the distance of the voting vector is 0, the function value may be 1, the standardized function decreases monotonously, and the function value may be 0 when the distance of the voting vector approaches infinity.

For example, the node similarity may be determined according to the following formula.

$$S_{ij} = 1/1 + |V_i - V_j|,$$

where $V_i$ denote the voting vector of the node i, $V_j$ denote the voting vector of the node j, $|V_i-V_j|$ reflects the distance between $V_i$ and $V_j$ (e.g., Euclidean distance).

In 540, iteratively calculating the will weight value of the node based on a will similarity between the nodes and the connection map to determine a target will weight value of the nodes.

The target will weight value of the node may be the general output of flow 500, and the target will weight value of the node may be taken as the will weight value of each user in flow 400.

In some embodiments, the iteratively calculating the will weight value of the node may be based on a preset algorithm. In some embodiments, the preset algorithm may include a pre-trained machine learning algorithm. Through iteratively calculating the connection map, the will weight value of the nodes with edges in the connection map may be reduced according to the edge features. For example, the iteratively calculation may be performed on the will weight value of the node according to the connection map and the will similarity between the nodes through a graph neural network (GNN).

In some embodiments, the preset algorithm may include an anti-community iteration algorithm. The anti-community iteration algorithm may iteratively calculate the will weight value based on the following formula:

$$U_i' = U_i - U_i \times f(\Sigma_{k \in M(i)} S_{ik} U_k R_{ik}),$$

where $U_i'$ denotes an iteration value of the will weight value of the node i after the present iteration, $U_i$ denotes an initial value of the will weight value of the node i before the present iteration. For example, the initial value of the will weight value in the first iteration may be a default value, the initial value of the will weight value in the second iteration may be the iteration value of the will weight value obtained by the first iteration. M(i) denotes one degree adjacent point of the node i, and the one degree adjacent point refers to other node directly connected with the node through one edge. $S_{ik}$ denotes the will similarity between the node k in the one degree adjacent point of the node i and the node i. $R_{ik}$ denotes the edge features of the edge between node k in the one degree adjacent point of the node i and node i. $R_{ik}$ may be represented through the closeness (such as the general closeness) between node i and node k. The descriptions of the closeness may be referred to corresponding contents of operation 510. f(·) may be a mapping function that may map an independent variable to the weight area [0, 1], for example, $f(x)=1/_{1+x^2}$.

In some embodiments, iterations with a specified count of round (such as 3 rounds) may be performed based on the iteration algorithm $U_1$ to determine the iterated $U_i'$ as the target will weight value of node i.

In some embodiments, before iteratively calculating the will weight value of each node, the initial value of the will weight value of each node may be determined first.

In some embodiments, the initial value of the will weight value may be preset. For example, the will weight value of each node may be a preset value (e.g., 0.5). In some embodiments, the initial value of the will weight value may be determined based on the weight rule of other user will. For example, the node features may be processed based on a watching duration rule, an execution ratio rule, a user's ID rule to determine the initial value of the will weight value of the node.

A method for determining the will weight value based on the anti-community weight rule is provided by some embodiments of the present disclosure. The method may prevent users from forming a unified group to perform unified voting, disturbing the free voting environment, thereby affecting the landscape live broadcast environment. As a result, the stability of the landscape live broadcast may be improved.

Figure 6:
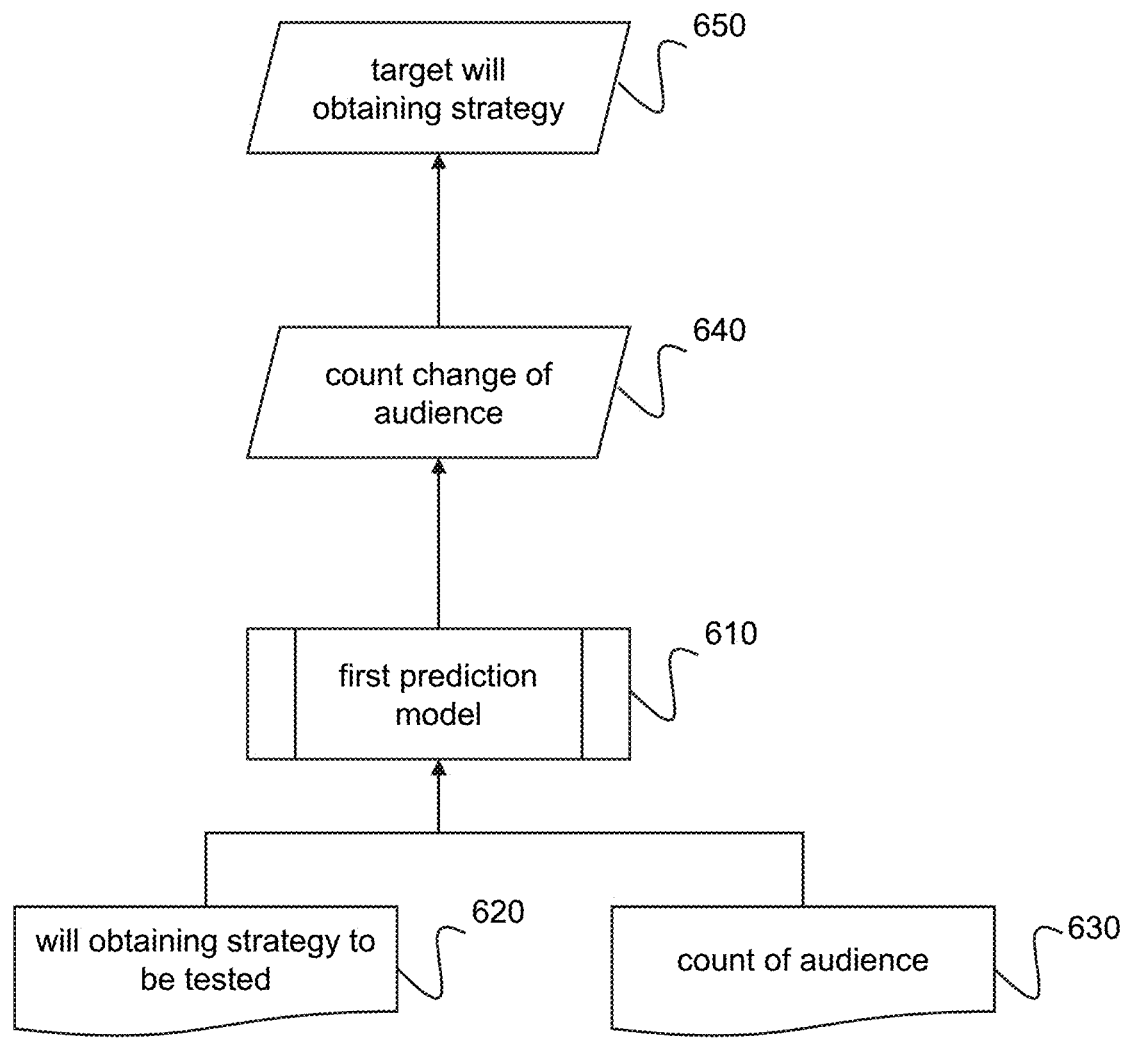
FIG. 6 is an exemplary structural diagram illustrating a first prediction model according to some embodiments of the present disclosure.

FIG. 6 is an exemplary structural diagram illustrating a first prediction model according to some embodiments of the present disclosure.

As shown in FIG. 6, when determining a target will obtaining strategy 650 based on a first prediction model 610, a will obtaining strategy to be tested 620 and a count of audience 630 (also referred as the current count of users of a corresponding user platform) of the live broadcast room corresponding to the will obtaining strategy to be tested may be input to the first prediction model 610. The predicted count change of audience 640 of the live broadcast room may be output after adopting the will obtaining strategy to be tested 620 through the processing of the first prediction model 610. According to the count change of audience 640 which may be resulted from the will obtaining strategy to be tested 620, the target will obtaining strategy 650 may be determined from the will obtaining strategy to be tested 620.

The first prediction model 610 may be a trained machine learning model. For example, the first prediction model 610 may be a trained deep neural network (DNN), a convolutional neural network (CNN), a recursive neural network (RNN), or a similar machine learning model.

In some embodiments, the first prediction model 610 may include a relevant algorithm that determines the general user will. Inputting the will obtaining strategy to be tested 620 to the first prediction model may adjust specific parameters of the algorithm related to the general user will.

The will obtaining strategy to be tested 620 may be various candidate will obtaining strategies. The will obtaining strategy to be tested 620 may determine the will weight value of each user to determine the general user will. In some embodiments, the will obtaining strategy to be tested 620 may further include related data such as a will obtaining frequency and a will obtaining period, etc.

In some embodiments, at least one general user will may be determined based on each will obtaining strategy to be tested 620. Inputting the will obtaining strategy to be tested 620 to the first prediction model 610 may be understood as inputting at least one general user will corresponding to the will obtaining strategy to be tested 620 to the first prediction model 610, so that the first prediction model 610 may predict the change count of audience 640 based on the general user will. At this time, the first prediction model 610 may predict the count change of audience 640 based on the general user will and the count of audience 630 in the live broadcast room.

The count of audience 630 in the live broadcast room may refer to the count of audience before the adjustment of the current landscape based on the general user will. For example, the count of audience 630 in the live broadcast room may be a total count of the audience in a will obtaining period.

The count change of audience 640 may refer to the change of the count of audience in the preset duration after the will obtaining strategy to be tested 620 is performed. For example, the count change of audience 640 may refer to a total count of count change of audience in a will obtaining period after performing the will obtaining strategy to be tested 620.

In some embodiments, considering that a natural growth rate of the live broadcast room has a small relationship with the will obtaining strategy to be tested 620, the count change of audience 640 may specifically refer to the count change of audience in the live broadcast room after performing the will obtaining strategy to be tested 620. For example, the count of change audience 640 may reflect the situation where the current audiences leave the live broadcast room within the will obtaining period after performing the will obtaining strategy to be tested 620.

The target will obtaining strategy 650 may be a strategy with the highest user satisfaction in the will obtaining strategy to be tested 620. In some embodiments, the will obtaining strategy to be tested whose count change of audience 640 has the most positive change (or the least negative change) may be taken as the will obtaining strategy to be performed according to the count change of audience 640 resulted from each will obtaining strategy to be tested 620.

In some embodiments, the first prediction model 610 may be determined based on an initial first prediction model trained through historical data. The initial first prediction model may be the first prediction model without parameters.

The historical data may include a training sample and a training label. The training sample may include the count of audience in the live broadcast room at a historical moment and the will obtaining strategy at the historical moment. The training label may include count change of audience in the live broadcast room within a preset duration of the historical moment. During the training, a model output may be determined by inputting the training sample to the first prediction mode. The model output and the training label may be input to a loss function, and based on the loss function, iterative calculations may be performed on the initial first prediction model until the training is completed. The trained initial first prediction model may be taken as the first prediction model 610. The training may complete when the count of iterations exceeds a threshold, or when a deviation value output by the model converges, etc.

According to the method of determining the will obtaining strategy based on the first prediction model provided by some embodiments of the present disclosure, suitable will obtaining strategies may be automatically chosen for different live broadcast situations, which may solve the problem of adaptation of different live broadcast conditions for the same will obtaining strategy, thereby improving the effect of a landscape live broadcast.

FIG. 7 is an exemplary flowchart illustrating an adjusting method of a camera device according to some embodiments of the present disclosure. In some embodiments, the flow 700 may be performed by the user platform 210.

As shown in FIG. 7, the flow 700 may include the following operations.

In 710, counting a count of audience of landscape images correspond to different user platforms in a preset duration and sending the count of audience to a management platform based on the service platform.

The count of audience of the landscape images may include a total count of non-repeating audiences and the rest count of audience, etc. of the landscape images in a preset duration. In some embodiments, the count of audience of the landscape images may further include the count of audiences of each sub-image in the landscape images.

In some embodiments, the preset duration may include one of a past period and a future period. The count of audience in the past period may be determined through a historical data. The count of audience in the future period may be determined through an estimated data.

In some embodiments, the preset duration may be divided into a historical duration and a future duration through a beginning moment, a current moment, and an ending moment.

In some embodiments, when the beginning moment and the end moment are both the time before the current moment, the preset duration may only include the historical duration, then the count of audience may be a total count of audience from the beginning moment to the end moment in the historical data. In some embodiments, when the beginning moment and the end moment are both the time after the current moment, the preset duration may only include the future duration, then the count of audience may be determined based on a machine learning model trained based on the historical data. In some embodiments, when the current moment is between the beginning moment and the end moment, the preset duration may be divided into the historical duration and the future duration to respectively determine the count of audiences and combine the counts.

In some embodiments, the user platform may process the count of audience of landscape images in a preset historical duration collected by existing camera points based on a third prediction model, and may predict the count of audience of landscape images in a preset future duration collected by existing camera points. The input of the third prediction model may be the count of audience of landscape images in a preset historical duration collected by existing camera points. The output of the third prediction model may be the count of audience of landscape images in a preset future duration collected by existing camera points.

In some embodiments, the third prediction model may be a trained machine learning model. For example, the third prediction model may be a trained deep neural network (DNN), a convolutional neural network (CNN), a recursive neural network (RNN), or a similar machine learning model.

In some embodiments, the third prediction model may be determined through training an initial third prediction model based on the historical data. The initial third prediction model may be the third prediction model without parameters.

The historical data may include a training sample and a training label. The training sample may include the count of audience of the landscape images collected by a predicted camera point in the preset historical period (such as from Jan. 1, 2020 to Jan. 7, 2020). The training label may include the count of audience of the landscape images collected by the camera point at a historical point or in a historical period (such as Jan. 8, 2020). During the training, the training sample may be input to the initial third prediction model to determine a model output, and the model output and training label may be input to a loss function. The initial third prediction model may be iteratively calculated based on the loss function until the training is completed. The trained initial third prediction model may be taken as the third prediction model. A completion of training may include the count of iterations exceeding a threshold, the deviation value of the model output converges, etc.

In 720, determining a camera device to be canceled based on the management platform.

A preset condition may refer to a condition that should be satisfied when maintaining the landscape images. For example, the preset condition may be a threshold condition of the count of audience (e.g., 100 people). When the count of audience is less than the threshold condition, there may be no need to continue opening the thread or the landscape, and the user platform may cancel the camera device corresponding to the landscape images. Exemplarily, when the count of audience of a sub-image in the landscape images does not satisfy the preset condition, the user platform may terminate the thread of the sub-image and may determine the camera device that produces the sub-image (such as determining an ID of the camera device according to the corresponding relationship). At the same time, the camera device may be canceled to save a thread traffic.

As shown in FIG. 7, the flow 700 may further include operations of adding camera devices and sub-images.

In 730, predicting the count of audience of the landscape images collected based on a candidate point through the management platform based on the count of audience corresponding to the landscape images collected by existing camera points.

The candidate point may refer to a camera location of the newly added camera device. The newly added camera device may obtain the landscape images from the candidate point.

In some embodiments, the candidate point may be determined according to feedback of the user. For example, the user may feedback the candidate points to be added through the user will. For another example, the user platform may determine the candidate point according to the user will not being regarded as the general user will. Exemplarily, for a live broadcast of a landscape of panda feeding, in the process of determining the general user will, most users want to watch the image of panda A and their wills may be selected as the general user will. A small part of the users wants to watch the image of panda B, then according to the user will of panda B, the observation point of panda B may be taken as one candidate point.

In some embodiments, the user platform may predict the count of audience based on the count of user feedbacks. For example, when a candidate point is feedback by a plurality of users, the count of audiences of the landscape images collected by the candidate point may be estimated according to the count of users feeding back the candidate point. Exemplarily, if there are 100 people feedback that they want to add a candidate point A, then the count of audience at the candidate point A may be 10,000.

In some embodiments, the user platform may process the coordinates of the existing camera points and their corresponding count of audiences as well as coordinates of the candidate points based on a second prediction model, and predict the count of audience of the landscape images collected based on the candidate points.

In some embodiments, the second prediction model may be a trained machine learning model. For example, the second prediction model may be a trained deep neural network (DNN), a convolutional neural network (CNN), a recursive neural network (RNN), or a similar machine learning model.

In some embodiments, the second prediction model may be determined through training an initial second prediction model based on the historical data. The initial second prediction model may be the second prediction model without parameters.

The historical data may include the training sample and the training label. The training sample may include the count of audience of other landscape images (and their sub-images) in the historical moment before adding the camera points, the corresponding coordinates of the landscape collection points, as well as the coordinates of the new camera points to be added. The training label may include the count of audience at the newly added camera point after the new camera point is added in the historical moment. The label may be manually annotated based on the statistical data of the historical count of audience at each point. During the training, the training sample may be input to the initial second prediction model to determine a model output, and the model output and the training label may be input to the loss function. The initial prediction model may be iteratively calculated based on the loss function until the training is completed. The trained initial prediction model may be taken as the second prediction model. A completion of training may include that the count of iterations exceeds a threshold, the deviation value of the model output converges, etc.

In 740, determining a candidate point whose count of audience satisfies a preset condition as a newly added camera point and configuring a corresponding camera device based on the newly added camera point.

In some embodiments, the preset condition may be a threshold of the count of audience. When the estimated count of audience at the candidate point is greater than the threshold of the count of audience, the object platform may configure the camera device at the candidate point to obtain the corresponding landscape images (or the sub-images of the landscape images). After configuring the camera device, the object platform may bind the newly added camera device (such as device ID) with the sensing network sub-platform, the management sub-platform, and the user platform, and send the landscape images obtained by the camera device to the corresponding user platform.

It should be noted that the above descriptions of the flows 300, 400, 500, 700 are merely for the purpose of illustration, and not intend to limit the scope of the present disclosure. For those skilled in the art, various of modifications and changes may be made to the flows 300, 400, 500, 700 under the guidance of the present disclosure. However, these modifications and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, which are within the spirit and range of the exemplary embodiments of this disclosure.

Moreover, certain terminology has been used to describe embodiments of the present disclosure. For example, the terms "one embodiment," "an embodiment," and/or "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or features may be combined as suitable in one or more embodiments of the present disclosure.

Furthermore, the recited order of processing elements or sequences, or the use of counts, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and range of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the counts expressing quantities or properties used to describe and claim certain embodiments of the application are to be understood as being modified in some instances by the term "about," "approximate," or "substantially." For example, "about," "approximate," or "substantially" may indicate a ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad range of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest range of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the range of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for controlling a public landscape live broadcast in a smart city, which is implemented based on an Internet of Things system for controlling the public landscape live broadcast in the smart city, the system including a user platform, a service platform, a management platform, a sensing network platform, and an object platform;

the method comprises:
obtaining, based on the object platform, a landscape image;
transmitting, based on the sensing network platform, the management platform, and the service platform in sequence, the landscape image to the corresponding user platform;
obtaining, based on a will obtaining strategy, at least one user will through the user platform and determining a general user will corresponding to the user platform, the at least one user will including an adjustment advice for the landscape image;
determining, according to the general user will, camera parameters of the object platform corresponding to the user platform through the user platform, wherein different object platforms correspond to different camera devices, and the landscape image played by the user platform is collected by their corresponding object platform;
transmitting, based on the management platform, and the sensing network platform in sequence, the camera parameters to the object platform corresponding to the user platform through the service platform; and
obtaining, based on the object platform, a new landscape image according to the camera parameters, wherein
the will obtaining strategy includes a weight rule of the user will and a will obtaining frequency, and the obtaining, based on the will obtaining strategy, at least one user will and determining a general user will corresponding to the user platform through the user platform comprises:
obtaining, based on the will obtaining frequency, the at least one user will by the user platform;
determining, based on the weight rule of the user will, a weight value of the user will corresponding to each of the at least one user will; and
determining, based on the at least one user will and the weight value of the user will, the general user will corresponding to the user platform; wherein
the weight value of the user will is an anti-community weight value obtained based on a connection map, comprising:
obtaining the connection map, which includes nodes and edges between the nodes, the nodes corresponding to the user currently proposing the user will, a node feature including an address, a working unit, a social media interaction, and a watching habit of the user; two nodes connected by an edge having a mutual effect, an edge feature including a closeness;

obtaining the user will of each node based on the connection map;

determining a will similarity between the nodes based on the user will of each node; and iteratively calculating the will weight value of the node based on the will similarity between the nodes and the connection map to determine a target will weight value of the nodes; wherein the iteratively calculating the will weight value of the node is implemented based on a preset algorithm, the preset algorithm including a pre-trained machine learning algorithm; the will weight values of the nodes with edges in the connection map are reduced according to the edge feature through iteratively calculating the connection map; wherein, for a certain node, the will weight value after the iterative calculation is negatively correlated to the closeness and the will similarity of the node and an one degree adjacent point of the node.

2. The method of claim 1, wherein a count of the user platforms is multiple, and different user platforms correspondently play the landscape images collected by different camera devices;

the service platform performs data storage, data process, or data transmission on data sent by different user platforms through different service sub-platforms;

the management platform is provided with a general management database and a plurality of management sub-platforms, the plurality of management sub-platforms respectively store and process the data sent by the plurality of service sub-platforms, and the general management database summarizes, stores, and processes data of the plurality of management sub-platforms, and transmits the data to a corresponding sensing network sub-platform;

the sensing network platform performs the data storage, the data process, or the data transmission on data collected by the different object platforms through different sensing network sub-platforms; and a count of object platforms is multiple, and the different object platforms are correspondingly arranged in the camera devices at different camera points.

3. The method of claim 1, wherein the will obtaining frequency is related to at least one of a count of audience and an audience activity of the landscape image.

4. The method of claim 1, wherein the weight rule of the user will includes a watching duration rule, and the weight value of the user will is related to a duration of the user watching the landscape image in the watching duration rule.

5. The method of claim 1, wherein the weight rule of the user will includes an execution ratio rule, and the weight value of the user will is related to a ratio of successful execution of the user will in the execution ratio rule.

6. The method of claim 1, further comprising:

counting, based on the service platform, a count of audience of the landscape images corresponding to different user platforms in a preset duration, and sending the count of the audience to the management platform; and determining, based on the management platform, a camera device to be canceled, the camera device to be canceled being the camera device corresponding to the landscape images whose the count of the audience does not satisfy a preset condition.

7. The method of claim 1, further comprising:

predicting, based on the count of the audience of the landscape image collected by an existing camera point, the count of the audience of the landscape image collected based on a candidate point through the management platform; and determining a candidate point whose the count of the audience satisfies the preset condition as a newly added camera point; and configuring, based on the newly added camera point, the corresponding camera device.

8. An Internet of Things system for controlling a public landscape live broadcast in a smart city, including a service platform, a management platform, a sensing network platform, and an object platform, wherein the object platform is configured to obtain a landscape image, and transmit, based on the sensing network platform, the management platform, and the service platform in sequence, the landscape image to a corresponding user platform; wherein different object platforms correspond to different camera devices;

the user platform is configured to:

play the landscape image, wherein the landscape image played by the user platform is collected by the corresponding object platform;

obtain at least one user will based on a will obtaining strategy, the at least one user will including an adjustment advice for the landscape image;

determine a general user will;

determine, according to the general user will, camera parameters of the object platform corresponding to the user platform;

transmit, through the service platform, the management platform, and the sensing network platform, the camera parameters to the object platform corresponding to the user platform; and obtain, based on the camera parameters, a new landscape image after the object platform receives the camera parameters, wherein the will obtaining strategy includes a weight rule of the user will and a will obtaining frequency, and the obtaining, based on the will obtaining strategy, at least one user will and determining a general user will corresponding to the user platform through the user platform comprises:

obtaining, based on the will obtaining frequency, the at least one user will by the user platform;

determining, based on the weight rule of the user will, a weight value of the user will corresponding to each of the at least one user will; and determining, based on the at least one user will and the weight value of the user will, the general user will corresponding to the user platform; wherein the weight value of the user will is an anti-community weight value obtained based on a connection map, comprising:

obtaining the connection map, which includes nodes and edges between the nodes, the nodes corresponding to the user currently proposing the user will, a node feature including an address, a working unit, a social media interaction, and a watching habit of the user; two nodes connected by an edge having a mutual effect, and an edge feature including a closeness;

obtaining the user will of each node based on the connection map;

determining a will similarity between the nodes based on the user will of each node; and iteratively calculating the will weight value of the node based on the will similarity between the nodes and the connection map to determine a target will weight value of the nodes; wherein the iteratively calculating the will weight value of the node is implemented based on a preset algorithm, the preset algorithm including a pre-trained machine learning algorithm; the will weight values of the nodes with edges in the connection map are reduced according to the edge feature through iteratively calculating the connection map; wherein, for a certain node, the will weight value after the iterative calculation is negatively correlated to the closeness and the will similarity of the node and an one degree adjacent point of the node.

9. A non-transitory computer-readable storage medium storing computer instructions, wherein when reading the computer instructions in the storage medium, a computer implements the method according to claim 1.

* * * * *